US009729912B2

(12) United States Patent
Kemp

(10) Patent No.: US 9,729,912 B2
(45) Date of Patent: Aug. 8, 2017

(54) METHOD, COMPUTER PROGRAM, ELECTRONIC DEVICE, AND SYSTEM

(71) Applicant: Sony Corporation, Minato-ku (JP)

(72) Inventor: Thomas Kemp, Esslingen (DE)

(73) Assignee: Sony Corporation, Tokyo (JP)

( * ) Notice: Subject to any disclaimer, the term of this patent is extended or adjusted under 35 U.S.C. 154(b) by 2 days.

(21) Appl. No.: 14/822,047

(22) Filed: Aug. 10, 2015

(65) Prior Publication Data
US 2016/0088338 A1 Mar. 24, 2016

(30) Foreign Application Priority Data

Sep. 22, 2014 (EP) ..................................... 14185792

(51) Int. Cl.
*H04N 21/422* (2011.01)
*H04N 21/439* (2011.01)
*H04N 21/41* (2011.01)
*H04N 21/4722* (2011.01)
*H04N 21/658* (2011.01)
*H04N 21/482* (2011.01)

(52) U.S. Cl.
CPC ... *H04N 21/42209* (2013.01); *H04N 21/4126* (2013.01); *H04N 21/4222* (2013.01); *H04N 21/4394* (2013.01); *H04N 21/4722* (2013.01); *H04N 21/6581* (2013.01); *H04N 21/4821* (2013.01)

(58) Field of Classification Search
CPC ........... H04N 21/43635; H04N 21/439; H04N 21/4722; H04N 21/4821; H04N 21/6581; H04N 21/4222; H04N 21/4394; H04N 21/4126; H04N 21/42209; H04N 1/00326; H04N 1/0097; H04N 1/32037; H04N 1/32048
See application file for complete search history.

(56) References Cited

U.S. PATENT DOCUMENTS

| 5,612,729 A * | 3/1997 | Ellis | G06K 9/00711 725/18 |
| 8,694,533 B2 | 4/2014 | Oztaskent et al. | |
| 2004/0116088 A1* | 6/2004 | Ellis | H04B 1/20 455/132 |

(Continued)

OTHER PUBLICATIONS

"Automated Content Recognition: Creating Content Aware Ecosystems", A White Paper by Civolution, Sep. 2012, 16 pages.

(Continued)

*Primary Examiner* — Chenea Smith
(74) *Attorney, Agent, or Firm* — Oblon, McClelland, Maier & Neustadt, L.L.P.

(57) ABSTRACT

A method comprises sending a control signal from an electronic device to a media device, the control signal comprising a channel preset identifier and causing the media device to switch to a channel identified by the channel preset identifier; receiving, at the electronic device, an audio signal emitted by the media device; generating, by the electronic device, an audio fingerprint from the received audio signal; obtaining, by the electronic device, channel meta information based on the audio fingerprint; and determining channel preset mapping information, the channel preset mapping information associating the channel preset identifier with the channel meta information.

15 Claims, 6 Drawing Sheets

(56) References Cited

U.S. PATENT DOCUMENTS

| | | | |
|---|---|---|---|
| 2005/0235319 A1* | 10/2005 | Carpenter | H04N 5/44543 725/52 |
| 2006/0221173 A1* | 10/2006 | Duncan | H04N 7/173 348/14.02 |
| 2011/0041154 A1* | 2/2011 | Olson | G06F 17/30787 725/54 |
| 2013/0058522 A1 | 3/2013 | Raesig et al. | |
| 2013/0111514 A1 | 5/2013 | Slavin et al. | |
| 2013/0205212 A1 | 8/2013 | Sinha et al. | |
| 2013/0308818 A1* | 11/2013 | MacIntosh | G06T 1/0021 382/100 |
| 2014/0002749 A1 | 1/2014 | Pora et al. | |
| 2014/0089815 A1 | 3/2014 | Gildfind et al. | |
| 2016/0050457 A1* | 2/2016 | Mondal | H04N 21/44204 725/18 |

OTHER PUBLICATIONS

Tom Simonite "Yahoo Gives the iPad the Power to Understand TV: An App That Knows What You're Watching Can Serve Up Related Web Articles or Other Information—as Well as Targeted Ads", MIT Technology Review, Nov. 2, 2011, 2 pages.

* cited by examiner

| Channel preset identifier | Channel abbreviation | Channel name |
|---|---|---|
| 1 | TNC | The News Channel |
| 2 | TSC | The Sports Channel |
| 3 | EDU | Education Now |
| 4 | M24 | Movie 24 |
| 5 | M1 | Music One |
| 6 | C1 | Classic One |

Fig. 6

| Wed., 30 Jul | 7:30 PM | 8:00 PM | 8:30 PM | 9:00 PM | 9:30 PM |
|---|---|---|---|---|---|
| TNC | The 7:30 report | The 8:00 report | The 8:30 report | The 9:00 report | The 9:30 report |
| TSC | Formula 1 | Decathlon | | | |
| M1 | Top 25 | Live from Alabama | | Rock under the Bridge | |
| M24 | Death in the Hotel | Behind the Murder | | | |
| EDU | Spanish 10 | Newscast | General Theory of Relativity for Beginners | | |
| C1 | Recorder Festival | Monteverdi: L'Orfeo | | | |

Fig. 7

METHOD, COMPUTER PROGRAM, ELECTRONIC DEVICE, AND SYSTEM

TECHNICAL FIELD

The present disclosure generally pertains to the field of controlling media devices, such as television sets, radio devices, home cinema systems, or the like.

TECHNICAL BACKGROUND

The term "second screen" generally refers to the use of a computing device (commonly a mobile device, such as a tablet or smartphone) to provide an enhanced viewing experience for content on another device, such as a television set or radio device.

Such computing devices provide to the user of the television set or radio device interactive features. For example an interactive electronic program guide (interactive EPG or IPG) may provide users with continuously updated scheduling information about broadcasts for current and upcoming television or radio programming, and may allow users to navigate such scheduling information interactively using an input device such as a keypad, keyboard or touchpad.

A second screen device may for example be used as remote control to select specific channel presets (commonly numbers between 1 and 99) of a television set or radio device. For example, the second screen device may communicate wireless via infrared with a television set or radio device in order to select a channel preset.

It is further known that second screen devices can be used to control the rendering of media streams on network accessible television sets or radio devices via a wireless local area network (WLAN) using networking protocols such as Universal Plug and Play (uPnP).

However, a second screen application such as an interactive electronic program guide has per se no way of knowing what broadcast channels the user has put on the channel presets of a television set or radio device. This renders the main use case of electronic program guides, namely EPG based program selection, on second screen devices difficult for television sets and radio devices which are controlled via infrared remote control.

In the case of a WLAN connection, both sides of the connection—television set and second screen device—can exchange information with each other if a common data format is agreed. That information may contain e.g. the name of the current channel, plus other metadata. Utilizing this metadata enables the tablet to display the current channel name rather than the channel number. The infrared port, on the other hand, does not typically permit such a feedback of information. In most cases, the infrared transfer is unidirectional (to the TV). If there is no WLAN connection possible—in cheaper devices, there is no WLAN modem built-in, the house WLAN might not penetrate through a concrete ceiling, or the TV manufacturer might use a WLAN protocol that is unknown to the tablet—controlling the setting of the channel may only be possible using infrared signals, and therefore, only possible by having the user memorizing the channel name/channel number assignment. Since there are dozens or hundreds of channels, and since it is often a long time (order of seconds) necessary to switch between any two channels, it is thus generally desirable to enhance the usability of second screen devices.

SUMMARY

According to a first aspect the disclosure provides a method comprising sending a control signal from an electronic device to a media device, the control signal comprising a channel preset identifier and causing the media device to switch to a channel identified by the channel preset identifier; receiving, at the electronic device, an audio signal emitted by the media device; generating, by the electronic device, an audio fingerprint from the received audio signal; obtaining, by the electronic device, channel meta information based on the audio fingerprint; and determining channel preset mapping information, the channel preset mapping information associating the channel preset identifier with the channel meta information.

According to a further aspect the disclosure provides a computer program comprising instructions for being executed on a processor of an electronic device, the instructions, when executed, causing the processor to perform: sending a control signal from the electronic device to a media device, the control signal comprising a channel preset identifier and causing the media device to switch to a channel identified by the channel preset identifier; receiving, at the electronic device, an audio signal emitted by the media device; generating, by the electronic device, an audio fingerprint from the received audio signal; obtaining, by the electronic device, channel meta information based on the audio fingerprint; and determining channel preset mapping information, the channel preset mapping information associating the channel preset identifier with the channel meta information.

According to a yet further aspect the disclosure provides an electronic device, the electronic device being configured to send a control signal to a media device, the control signal comprising a channel preset identifier and causing the media device to switch to a channel identified by the channel preset identifier; receive an audio signal emitted by the media device; generate an audio fingerprint from the received audio signal; obtain channel meta information based on the audio fingerprint; determine channel preset mapping information, the channel preset mapping information associating the channel preset information with the channel meta information.

Further aspects are set forth in the dependent claims, the following description and the drawings.

BRIEF DESCRIPTION OF THE DRAWINGS

Embodiments are now explained by way of example with respect to the accompanying drawings, in which:

FIG. 6 schematically shows a data structure which stores channel preset mapping information collected by a calibration process; and FIG. 7 schematically shows an electronic program guide displayed on an electronic device.

DETAILED DESCRIPTION OF EMBODIMENTS

Figure 1:
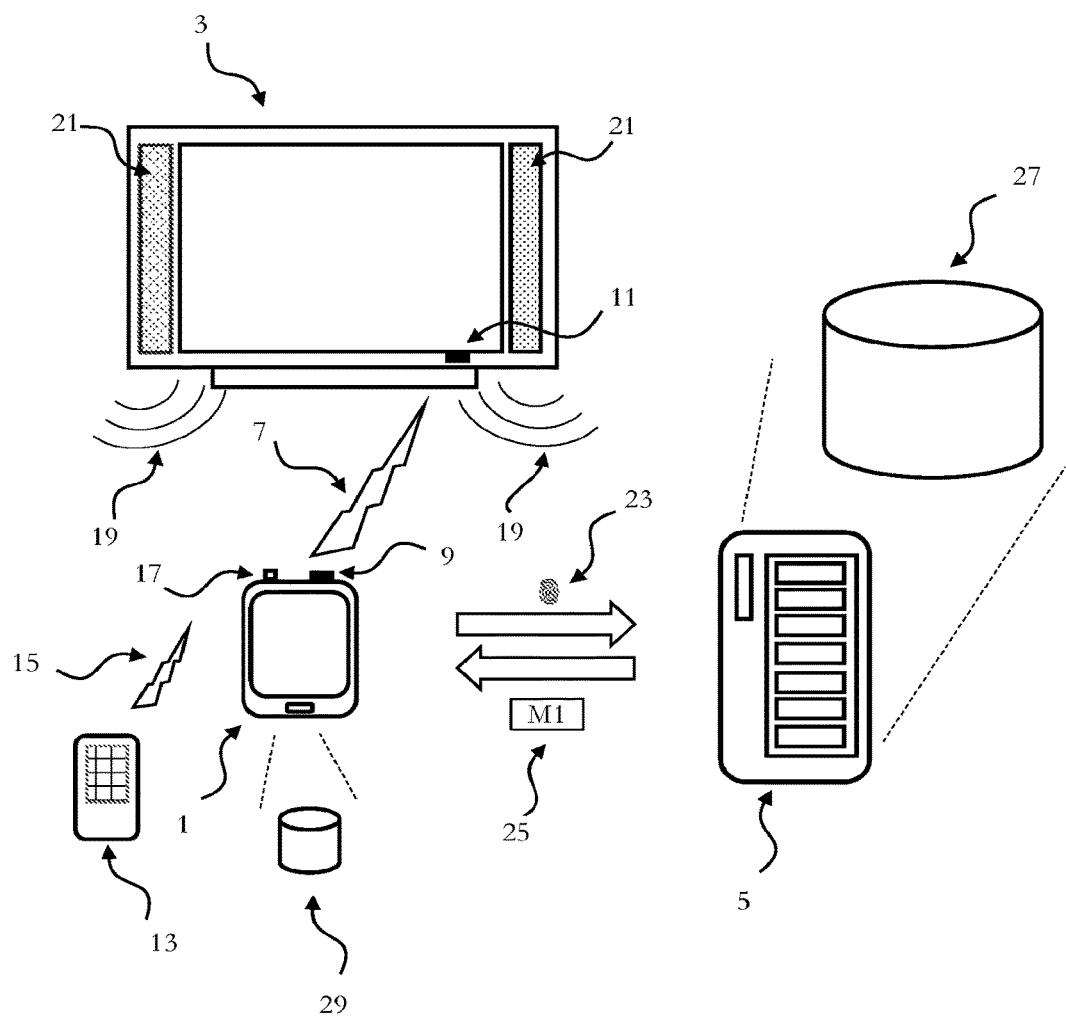
FIG. 1 schematically shows an embodiment of a system comprising a tablet computer, a television set, and an audio fingerprint identification service.

Before a detailed description of the embodiments under reference of FIG. 1 will be given, some general explanations concerning the embodiments are made.

Embodiments are disclosed below of a method comprising sending a control signal from an electronic device to a media device, the control signal comprising a channel preset identifier and causing the media device to switch to a channel identified by the channel preset identifier; receiving, at the electronic device, an audio signal emitted by the media device; generating, by the electronic device, an audio fingerprint from the received audio signal; obtaining, by the electronic device, channel meta information based on the audio fingerprint; and determining channel preset mapping information, the channel preset mapping information associating the channel preset identifier with the channel meta information.

The electronic device which sends the control signal to a media device may be any kind of computing device such as a tablet computer, a smartphone, or a notebook computer. The electronic device may in particular be a portable device.

The media device may be a media presentation device such as a television set, a set top box in combination with a display device, a video recorder in combination with a display device, or the like. The media device may comprise any kind of digital media receiver such as a FM/AM receiver. The media device may for example be an ATSC/DVB digital television device or DAB digital radio device, or any kind of analogue television or radio device such as a PAL/NTSC receiver. In particular, the media device may comprise a tuner subsystem that receives radio frequency (RF) transmissions like radio broadcasts on subcarriers and converts the selected carrier frequency and its associated bandwidth into a fixed frequency that is suitable for further processing. A television tuner for example may convert a radio frequency analog television or digital television transmission into audio and video signals which can be further processed to produce audio and/or video.

Known analogue and digital television sets or radio devices are typically configured to define a set of channel presets (or "favorites"), that is channels the user may program to correspond to specific RF subcarriers or digital transport streams. Each channel preset is typically identified by a preset identifier, for example a number between 1 and 99.

Programming a channel preset may comprise associating a preset identifier with a specific broadcast channel (RF subcarrier and/or digital transport streams). For example, in an analogue television set, a preset identifier is associated with the broadcast frequency of a specific broadcast channel. In digital TV, the receiver must not only find the physical channel itself, but also decode its metadata to remap virtual channel numbers to their proper locations in a transport stream. When a user defines a channel preset for a digital television set, information about the physical channel and information from the internal channel map concerning the selected channel is associated with the respective preset identifier, and the thus defined preset is stored in a memory of the television set. Such channel presets can, in today's television sets and radio devices, be defined manually or by means of an automated channel scan.

The control signal may be sent from the electronic device to the media device on any kind of communication path, in particular on a wireless communication path. In the embodiments disclosed below the electronic device comprises an infrared transmitter, the media device comprises an infrared receiver and the control signal is an infrared signal. As the disclosed methods work with infrared signals, they work in absence of a working WLAN connection. Further, they work with television sets that are from other manufacturers and are using different, unknown formats to transfer metadata (or do not transmit metadata at all).

The control signal causes the media device to switch to a channel identified by the channel preset identifier. The channel may for example be a RF subcarrier and/or digital transport stream on which media is transmitted by a broadcaster.

Upon switching to the channel identified by the channel preset identifier, the media device presents media transmitted on the channel, the media comprising, for example, audio and/or video. Audio may be emitted by loudspeakers of the media device. Video may be emitted by a display screen of the media device.

An audio signal emitted by the media device may be received at the electronic device. To this end the electronic device may comprise a microphone. This microphone may be a built-in microphone of the electronic device.

From the received audio signal the electronic device generates an audio fingerprint. An audio fingerprint may be a digital bit sequence (also called "audio signature") that is deterministically generated from an audio signal and that can be used to identify an audio sample or quickly locate similar items in an audio database. Audio fingerprinting techniques as such are well known to the skilled person. A review of audio fingerprinting techniques which may in embodiments be used for identifying fingerprints is for example given by H B Kekre et al. in "A Review of Audio Fingerprinting and Comparison of Algorithms", International Journal of Computer Applications, Volume 70, Number 13, pages 24-30, May 2013, published by Foundation of Computer Science, New York, USA. Other audio fingerprinting techniques may also be used.

An audio fingerprint may be used by the electronic device to obtain channel meta information based on the audio fingerprint. To this end, the electronic device may cause matching of the collected audio fingerprint with a set of reference audio fingerprints.

Metadata may comprise any kind of information which describes a piece of media, such as a piece of music, a movie, an advertisement, a newscast, or the like. Metadata may for example comprise the title of a piece of music or movie. Metadata may also comprise information about the originator, for example about the broadcaster who broadcasts the piece of media. Also, metadata may comprise supplementary information such as information about the performer of a piece of music, or the actors acting in a movie.

Metadata may in particular be used to obtain channel meta information which can be attributed to the audio fingerprint collected by the electronic device. Channel meta information may for example identify the broadcaster (provider/operator/network/channel) who broadcasts the media corresponding to the audio fingerprint. The channel meta information may for example be a channel name (e.g. "Movie 24") and/or a channel abbreviation ("M24"), and/or a channel identifier (e.g. a numerical or alphanumerical string attributed to the broadcaster).

The channel meta information may be directly obtained from the meta information that is associated with the audio fingerprint. This may in particular the case when the meta information contains a broadcaster name, abbreviation, or identifier.

A set of reference audio fingerprints may be located internal to or external to the electronic device.

According to some embodiments, obtaining channel meta information comprises comparing, in the electronic device, the audio fingerprint to a set of reference fingerprints stored locally in the electronic device to determine a matching audio fingerprint; and obtaining channel meta information based on the matching audio fingerprint.

For example a set of reference audio fingerprints may reside in the memory of the electronic device together with corresponding meta information describing the media from which the fingerprint was obtained. Upon a match between a collected audio fingerprint and a reference audio fingerprint, the electronic device may attribute the metadata of the reference audio fingerprint to the collected audio fingerprint.

The channel meta information may also be indirectly obtained from the meta information that is associated with the audio fingerprint. If for example, the meta information contains a media title, electronic program guide information available to the electronic device may be used to identify the channel which broadcasted the media corresponding to the audio fingerprint. In addition, a time of reception of the collected audio fingerprint may be taken into account when determining channel meta information based on an audio fingerprint.

The electronic device may for example obtain a set of reference audio fingerprints by sending a signal to a reference fingerprint provider, the signal comprising timing information; and receiving from the reference fingerprint provider a set of reference fingerprints, the composition of the set of reference fingerprints depending on the timing information sent to the reference fingerprint provider. Together with the set of reference fingerprints the reference fingerprint provider may transmit meta information related to the respective reference fingerprints to the electronic device.

The timing information may for example comprise a time point and/or a time interval. The timing information may for example indicate as time point the current time and a time interval of 10 minutes. In response to the signal, the reference fingerprint provider will return a set of reference signatures which comprises reference signatures related to pieces of media broadcast during the time interval indicated by the timing information. For example, in the case that the timing information relates to a time interval in the past, the reference fingerprint provider may return the set of reference signatures immediately. As another example, if the timing information relates to a time interval in the future or to a time interval which has not yet ended, the reference fingerprint provider may return the set of reference signatures as soon as these reference signatures have been collected. In addition the electronic device may also send to the reference fingerprint provider location information that indicates the location of the electronic device. Such location information may for example be information obtained by a UPS sensor in the electronic device. Alternatively or in addition the location information may identify a geographical region the electronic device is located in.

In other embodiment, the obtaining channel meta information comprises transmitting the audio fingerprint to an audio fingerprint identification service; and receiving the channel meta information from the audio fingerprint identification service.

The electronic device may for example send an audio fingerprint captured from the audio of a media device to a server computer or cloud server system of the audio fingerprint identification service via a communication network such as the Internet. The audio fingerprint identification service may maintain a library of reference audio fingerprints, for example in a database, and may be arranged to match the transmitted audio fingerprint with reference audio fingerprints stored in the library of reference audio fingerprints. Upon a match the audio fingerprint identification service may return meta data associated with the matching reference signature to the electronic device. The meta data received from the audio fingerprint identification service may then be used by the electronic device to identify the channel which broadcasted the media corresponding to the collected audio fingerprint.

The electronic device may receive channel meta information as part of the meta information from the audio fingerprint identification service. Alternatively or in addition the electronic device may take EPG information and/or timestamps of the audio fingerprint into account when determining channel meta information based on a collected audio fingerprint. Also, the electronic device may transmit a time-stamped audio fingerprint to the audio fingerprint identification service to assist the service in identifying the audio fingerprint.

To communicate with the audio fingerprint identification service, the electronic device may be connected to the audio fingerprint identification service via an Internet connection (via e.g. WLAN, or GPRS/UMTS/LTE data communication).

The audio fingerprint identification service maintaining the reference signature database may for example be addressed by the electronic device via an application programming interface.

Having determined channel meta information based on a collected audio fingerprint, the electronic device may determine channel preset mapping information, the channel preset mapping information associating a channel preset identifier with the corresponding channel meta information. The channel preset mapping information may be stored in a memory of the electronic device, for example in a data structure that correlates channel meta information with corresponding channel preset identifiers. The data structure may for example be a table or a database, that stores for each channel preset respective channel meta information. Having identified channel meta information, the electronic device knows which channels are associated with which channel presets on the particular media device under consideration.

In the embodiments described below the channel preset mapping information is stored in a persistent memory. Storing the channel allows the electronic device to persistently know which channel is tuned on which channel preset of the media device without having to redo the determination of the channel meta information.

The electronic device may manage channel preset mapping information of one or more media devices. If the electronic device manages channel preset mapping information for multiple media devices, then the electronic device channel preset mapping information may in addition comprise information identifying the specific media device to which a managed channel preset belongs. For example, infrared control signals (e.g. infrared codes) used to control a specific media device to switch to a specific channel preset may be stored together with the channel preset mapping information.

According to other embodiments a method comprises determining, for each channel preset from a predefined group of channel presets, channel preset mapping information according to the methods described above.

For example, the methods described above may be repeated for multiple channel presets of a media device in a preset calibration/scanning process. Such a calibration process may go through all channel presets defined in a media device one by one and perform the determination of channel preset mapping information for each channel preset as described above. Alternatively, such a calibration process may step through only a subset of the channel presets defined in the media device. A subset of channel presets may for example be determined in the electronic device in a manual way by the user. The determining channel preset mapping information may be executed in a preset calibration stage one by one for all channel presets in the predefined group of channel presets.

If for example the electronic device is programmed and used by a user as a remote control for a media device, the subset of channel presets used in the calibration process may be the set of channel presets that has been programmed in the electronic device for use as remote control. It can for example be assumed that the electronic device is able to switch channels on the television set by infrared commands, i.e. that the electronic device knows the specific infrared command sequence that is required to switch the television set to a specific channel preset. This knowledge can be e.g. preprogrammed, kept in a database of the electronic device and selected by the user, or learnt from observing the remote control of the television set in question.

A method may further comprise displaying electronic program guide information on a screen of the electronic device; receiving a user selection concerning a program comprised in the electronic program guide information; determining channel meta information based on the program selected by the user; determining a channel preset identifier corresponding to the channel meta information based on channel preset mapping information, the channel preset mapping information having been obtained according to the scanning method described above; and sending a control signal to a media device, the control signal comprising the channel preset identifier and causing the media device to switch to a channel identified by the channel preset identifier.

The electronic program guide information may be obtained by the electronic device from an electronic program guide service via a communication network.

The electronic device may comprise an electronic program guide application program which, after having been launched on the electronic device, fetches electronic program guide information from an electronic program guide service and displays the electronic program guide information to the user on screen. The electronic program guide information displayed to the user may for example be a program schedule comprising broadcast programs on available channels for the current day. Such a program schedule may display to the user a title of a piece of media (e.g. "News of today"), a broadcast time of this piece of media (e.g. "7:30 PM") and a name of the channel (e.g. 'Movie 24') and/or a channel abbreviation ("M24") of the broadcaster who broadcasts this piece of media. A user may select such a piece of media, e.g. by performing a predefined touch gesture on the piece of media. Upon selection of a piece of media the electronic device may determine channel meta information based on the program selected by the user. For example, the electronic device may extract the abbreviation of the broadcast channel (e.g. "M24") from the electronic program guide information and use this abbreviation (or identifier of the broadcast channel) as channel meta information. Next, the electronic device may consult a data structure that stores for each channel preset respective channel meta information and select from this data structure the specific channel preset which is attributed to the channel meta information obtained from the users's electronic program guide selection. Having determined the channel preset, the electronic device may emit a respective control signal which triggers a media device to switch to the channel preset identified by the electronic device. The media device will thus switch to the channel preset identified by the control signal and start presenting audio and/or video which corresponds to the piece of media selected by the user of the electronic device (in the example described here, the piece of media titled "News of today").

In alternative embodiments, the electronic device may extract other channel meta information such as channel identification numbers or the like from the electronic program guide for use in consulting the channel preset mapping information.

The described methods may be realized as computer-implemented methods.

A computer program may comprise instructions for being executed on a processor of an electronic device, the instructions, when executed, causing the processor to perform: sending a control signal from the electronic device to a media device, the control signal comprising a channel preset identifier and causing the media device to switch to a channel identified by the channel preset identifier; receiving, at the electronic device, an audio signal emitted by the media device; generating, by the electronic device, an audio fingerprint from the received audio signal; obtaining, by the electronic device, channel meta information based on the audio fingerprint; and determining channel preset mapping information, the channel preset mapping information associating the channel preset identifier with the channel meta information.

The computer program may be part of an interactive electronic program guide application. Alternatively, the method may be implemented as a stand-alone application.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

The above described methods may be implemented in an electronic device.

An electronic device may be configured to send a control signal to a media device, the control signal comprising a channel preset identifier and causing the media device to switch to a channel identified by the channel preset identifier; receive an audio signal emitted by the media device; generate an audio fingerprint from the received audio signal; obtain channel meta information based on the audio fingerprint; determine channel preset mapping information, the channel preset mapping information associating the channel preset information with the channel meta information.

The electronic device may for example be a tablet computer, a smartphone, or a notebook computer.

The embodiments also disclose a system that comprises an electronic device as described above, and a reference fingerprint provider, the electronic device being configured to request a set of reference fingerprints from the reference fingerprints provider.

Further, the embodiments also disclose a system comprising an electronic device as described above and an audio fingerprint identification server, the electronic device transmitting an audio fingerprint to the audio fingerprint identification service, and receiving channel meta information related to the audio fingerprint from the audio fingerprint identification service.

The embodiments described below with reference to FIGS. 1 to 7 allow to utilize the audio fingerprinting technology to listen with the built-in microphone of a tablet computer to a broadcast program, and to identify the channel preset to broadcast channel (TV station) mapping by an audio fingerprinting match. The tablet computer will enter a calibration (learning/scanning) stage once, which could e.g. be started in the morning when the user leaves his home, and which is finished in the evening. During the calibration phase, the tablet computer will switch through all available channels and identify/associate them one by one. After this process, the system can automatically offer the user the functionality of double-clicking on an electronic program guide item and the television set will switch on and go to the right channel. This process can be realized technically in a client-server scenario, where information about the user's television channel selection would be transmitted to the server, or in a completely anonymous, client-only way that preserves privacy.

FIG. 1 schematically shows an embodiment of a system comprising an electronic device, here a tablet computer 1, a media device, here a television set 3, and an audio fingerprint identification service 5.

Television set 3 is arranged to receive multiple broadcast programs on multiple broadcast channels. To this end television set 3 maintains a list of channel presets. Each channel preset identifies a specific physical channel and/or transport stream on which a broadcast channel is transmitted. In the embodiment described here there is a one-to-one correspondence between channel presets and broadcast channels. Television set 3 is configured so that channel preset "1" identifies a physical channel on which the channel named "The News Channel" broadcasts its broadcast programs. Further, television set 3 is configured so that channel preset "2" identifies a physical channel on which the channel named "The Sports Channel" broadcasts its sports program. Further, television set 3 is configured so that channel preset "3" identifies a physical channel on which the channel named "Education Now" broadcasts its education program. Still further, television set 3 is configured so that channel preset "4" identifies a physical channel on which the channel named "Movie 24" broadcasts movies. Still further, television set 3 is configured so that channel preset "5" identifies a physical channel on which the channel named "Music One" broadcasts its pop music program.

Finally, television set 3 is configured so that channel preset "6" identifies a physical channel on which the channel named "Classic One" broadcasts its classic music program.

The user can use a conventional infrared remote control 13 to address the channel presets in a conventional way. However, when using the conventional infrared remote control 13 to switch between channels, the user who wants to quickly access a specific broadcast program has to remember which broadcast program is programmed on which channel preset.

Tablet computer 1 acts as second screen for television set 3. When watching a broadcast program on television set 3, the user may at the same time use applications on the tablet computer 1, for example an electronic program guide application to browse through a program guide, a web client application to surf the Internet, or an instant messaging application to tell friends about what he sees on television set 3.

Tablet computer 1 is equipped with an infrared transceiver 9. Television set 3 is equipped with an infrared receiver 11. Tablet computer 1, via infrared transceiver 9, can transmit infrared signals 7 to infrared receiver 11 of television set 3. Tablet computer 1 has been programmed to learn the infrared commands which trigger television set 3 to switch to specific channel presets. This may for example be done by causing a conventional infrared remote control 13 of television set 3 to transmit an infrared signal 15 comprising channel preset information for a specific channel preset and pointing the conventional infrared remote control 13 towards infrared transceiver 9 of tablet computer 1. Upon receipt of this infrared signal 15 from conventional infrared remote control 13, tablet computer 1 can decode and store the channel preset information comprised in the infrared signal 15 and use this channel preset information to itself code an infrared signal 7 which causes television set 3 to switch to the channel preset identified by the channel preset information. In this way, tablet computer 1 may learn some or all of the channel presets used by television set 3.

After having learned the correct infrared commands, tablet computer 1 may act as a remote control by sending, in the form of infrared signal 7, channel preset information to television set 3. Upon receipt of the infrared signal 7, the television set switches to the channel preset identified by the channels preset information comprised in infrared signal 7.

The user, when teaching tablet computer 1 the correct infrared signals to control television set 3, may manually attribute channel names to channel presets defined in tablet computer 1. However, attributing channel names to channel presets requires the user to type alphanumeric characters into tablet computer 1. This may be cumbersome on a touch device, in particular if many channel presets have to be defined by the user.

To assist the user in attributing the correct broadcast channels to the channel presets defined in television set 3, the tablet computer 1 is programmed to perform an automatic calibration process. To this end, the tablet computer 1 is programmed to make use of microphone 17. Microphone 17 receives an audio signal 19 which is emitted from loudspeakers 21 of television set 3.

The tablet computer 1 is programmed so that during the automatic calibration process, tablet computer 1 addresses all channel presets, one after another, and "listens" to audio emitted by television set 3 upon switching to a respective channel preset selected by tablet computer 1. To this end, tablet computer 1 transmits an infrared signal 7 comprising channel preset information to television set 3. Television set 3 switches to the channel preset 3 and starts emitting audio 19 and video of the broadcast program which is broadcast on the broadcast channel programmed on the channel preset selected by tablet computer 1. Tablet computer 1 captures audio 19 and extracts one or more audio fingerprints 23 from the captured audio 19, and stores the collected audio fingerprints in its memory. Having collected an audio fingerprint, tablet computer 1 transmits the audio fingerprints 23 to audio fingerprint identification service 7. Audio fingerprint identification service 7 hosts a database 27 of reference audio fingerprints which are associated with respective channel meta information. Audio fingerprint identification service 7 matches the audio fingerprints 23 received from tablet computer 1 to its library of reference audio fingerprints. Having identified matching reference fingerprints, the fingerprint identification service 7 determines respective meta information 25 and transmits this meta information 25 back to tablet computer 1. Tablet computer 1 determines channel meta information from meta information 25 and stores, as channel preset mapping information 29, this channel meta information together with the channel preset identifier corresponding to the broadcast program from which the audio fingerprints 23 were captured.

Tablet computer 1 is programmed to repeat this determination of channel preset mapping information 29 for some or all of the channel presets defined in tablet computer 1.

This calibration process can run automatically without that the user needs to type alphanumeric text into tablet computer 1. The user must not even be present during the calibration process. Tablet computer 1 will enter the calibration (learning) stage once, which could e.g. be started in the morning when the user leaves his home, and which is finished in the evening. During the calibration phase, tablet computer 1 will switch through all available channel presets and identify/associate them one by one.

After having determined all channel preset mapping information 29, the electronic device is capable of automatically mapping channel presets to channel names, and vice versa. This may for example be used in an electronic program guide application running on tablet computer 1 to enable the electronic device to automatically select the correct channel preset upon a user selection of a broadcast program in the electronic program guide application. After this calibration, the system can for example automatically offer the user the functionality of double-clicking on an item of an electronic program guide and the television set will switch on and go to the correct channel.

In the client-server scenario described with regard to FIG. 1, the fingerprint identification server may continuously monitor all television programs of a given reception area, and may extract fingerprints of all broadcast programs at all time instances. A client (e.g. tablet computer 1 or a smartphone), will also extract one such fingerprint (or more such fingerprints) from the audio input it "hears" from the television set in its room, and send this fingerprint to the server for comparison. If the server detects a match between the client fingerprint and any server fingerprint, it has identified the channel, and will send the name of the channel—which has been learned by the server e.g. by manual data entry—back to the client.

Figure 2:
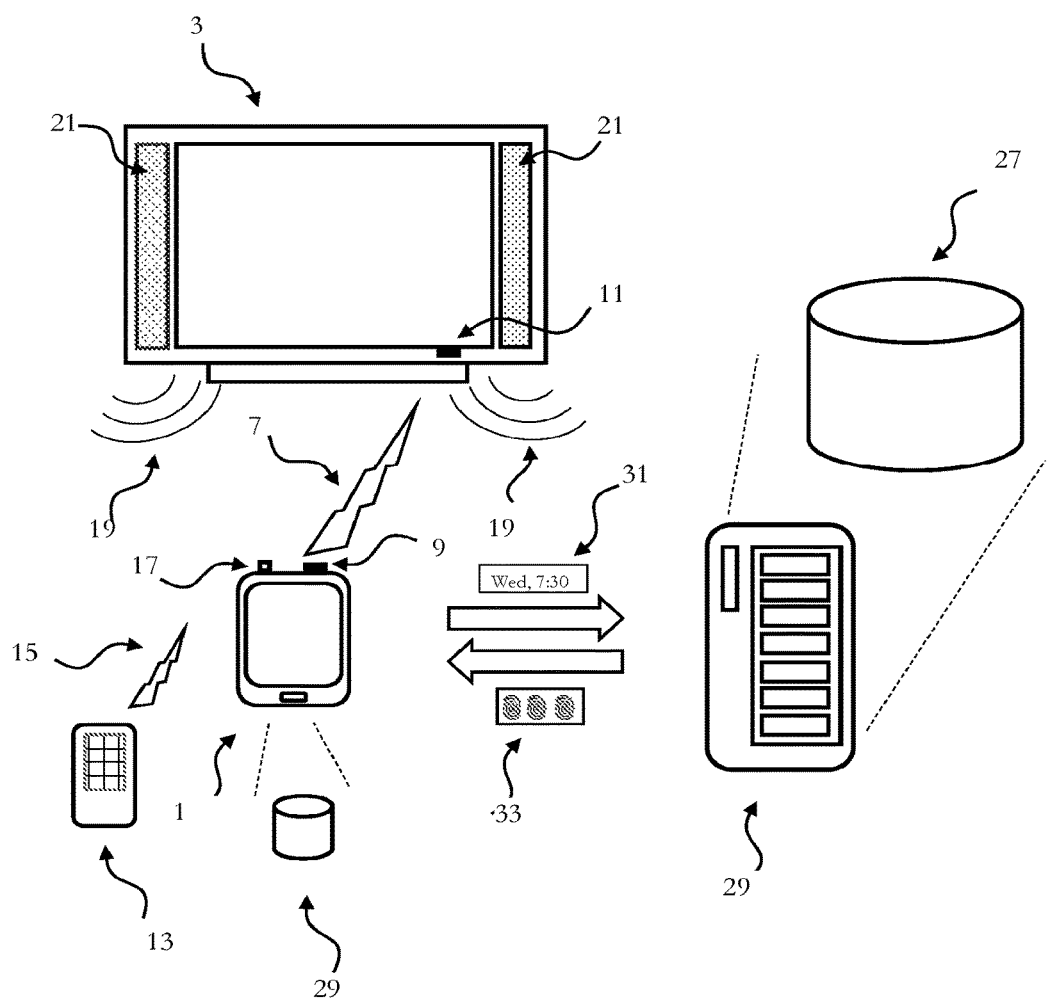
FIG. 2 schematically shows an embodiment of a system comprising a tablet computer, a television set, and a reference fingerprint provider.

FIG. 2 schematically shows an embodiment of a system comprising a tablet computer 1, a television set 3, and a reference fingerprint provider 29. Elements of FIG. 2 with the same reference numeral as used in FIG. 1 have substantially the same function as described with respect to the embodiment of FIG. 1 above. According to this alternative embodiment of FIG. 2, the audio reference fingerprint service 5 of FIG. 1 hosting a library of reference fingerprints 27 is replaced by a reference fingerprint provider 29. Like the audio reference fingerprint service 5 of FIG. 1, the reference fingerprint provider of FIG. 2 hosts a library of reference fingerprints 27.

According to the embodiment of FIG. 2 the tablet computer 1 is configured to transmit timing information 31 to reference fingerprint provider 29. This timing information 31 may for example indicate a timespan of one day which starts this Wednesday at 7:30 pm. Upon receipt of timing information 31 reference fingerprint provider 29 identifies media which are broadcast during the timespan identified by timing information 31, retrieves any audio reference signatures and respective meta information from the library 27 of reference fingerprints and transmits this set of reference signatures and respective meta information 33 to the tablet computer 1 as a response to timing information 31.

According to this embodiment, tablet computer 1 is programmed to do the matching of collected fingerprints with fingerprints of the set of fingerprints 33 received from the reference fingerprint provider 29 internal to the tablet computer 1. The mechanisms for doing the fingerprint matching in the tablet computer 1 may be the same as those used by the audio reference fingerprint service 5 of FIG. 1. As the set of reference fingerprints 33 processed by tablet computer 1 is only a small subset of the entirety of reference fingerprints stored at the audio reference fingerprint service 5, the computing capabilities of tablet computer 1 are sufficient to do the processing.

In yet an alternative embodiment, service 5 as depicted in FIG. 1 acts as audio reference fingerprint service and reference fingerprint provider 29 of FIG. 2 at the same time. That is, the service may be addressed by tablet computer 1 to identify fingerprints 23 (FIG. 1) transmitted to the service, or, alternatively or in addition, tablet computer 1 may at the same time use the service to request sets of reference signatures 33 (FIG. 2) from the service in response to timing information sent to the service.

In the privacy-conserving scenario described in FIG. 2, the server may monitor all television programs of a given reception area every minute (or every two, three, 10 minutes), at an exactly known time (e.g. 10:00, 10:01, 10:02 . . . ) for a short while, e.g. 15 seconds, and store the fingerprints along with the channel names into a file. Said file may then be made available to the user of the tablet computer to download. In order to do a channel preset/channel name match, the tablet will switch to the unknown channel preset at the time the server fingerprint is taken (e.g. at 10:01 in the above example), listen to the audio from the television set, and store the result as a fingerprint. It may then download the data file containing the server side fingerprints according to the same timestamp (10:01 in the example), once said datafile becomes available, and may perform the matching of the channel preset to the channel name on the tablet computer locally. This way, the server has no load rather than computing the fingerprints once, and the process is also completely private.

In both scenarios described in FIG. 1 and FIG. 2, the tablet computer may repeat the matching of channel presets to channel names repeatedly until all channel presets have been identified. If a channel preset is detected that has no audible information, the process can be repeated at a later time. Should a channel preset never return useful audio, it can be marked as inactive or silent automatically.

With the embodiments described here there is thus no need of manual interaction of the user with the system. The system may work completely automatic. It can be repeated easily whenever the channel assignment on the television set is changed, and it can be made completely privacy-conserving. By using one or the other way of matching as described above, workload can be arbitrarily moved from the server to the client and vice versa.

Figure 3:
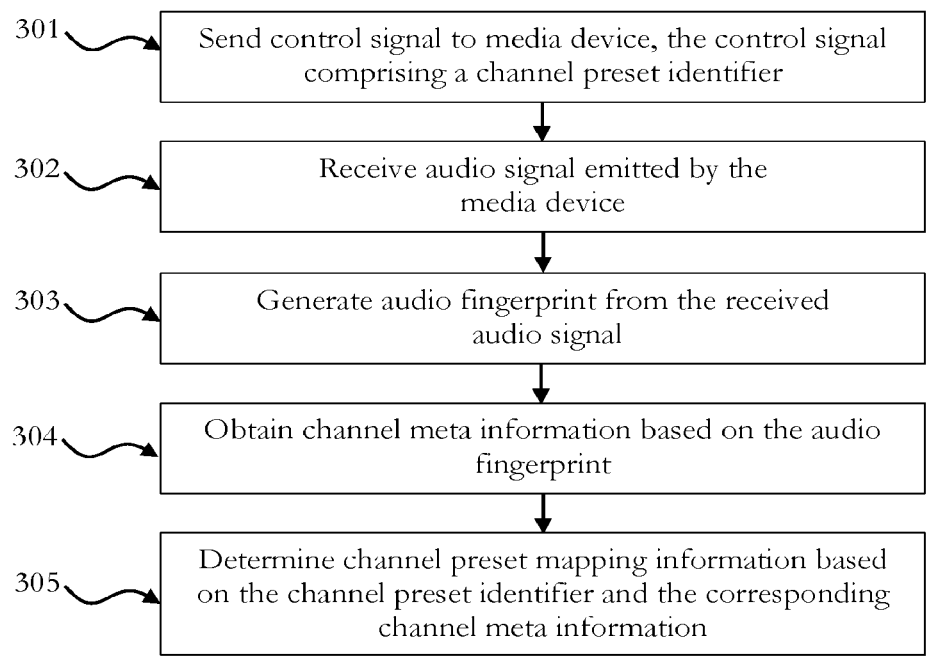
FIG. 3 schematically shows an embodiment of a method for determining channel preset mapping information.

FIG. 3 schematically shows an embodiment of a method for determining channel preset mapping information. At 301, an electronic device sends a control signal to a media device, the control signal comprising a channel preset identifier and causing the media device to switch to a channel identified by the channel preset identifier. At 302 the electronic device receives an audio signal emitted by the media device. At 303 the electronic device generates an audio fingerprint from the received audio signal. At 304, the electronic device obtains channel meta information based on the audio fingerprint. At 305, the electronic device determines channel preset mapping information, the channel preset mapping information associating the channel preset identifier with the channel meta information.

Figure 4:
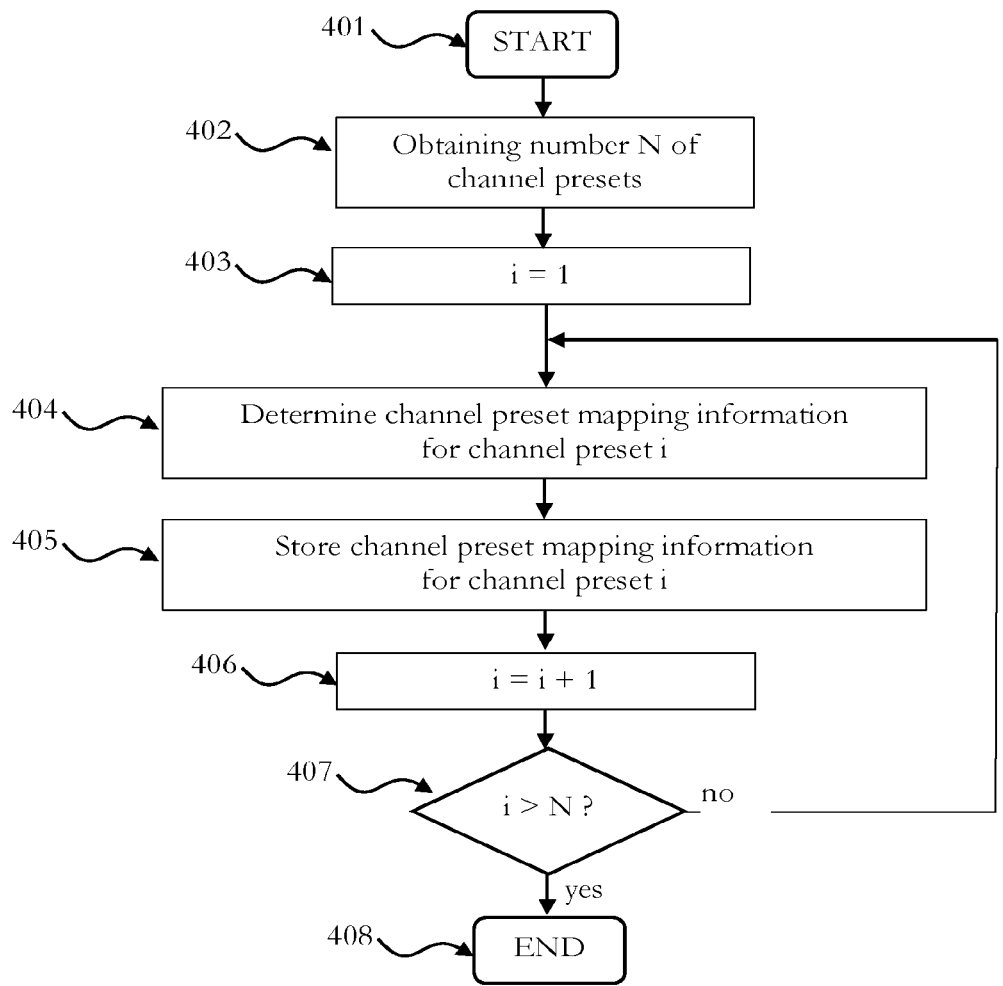
FIG. 4 schematically shows an embodiment of a method for calibrating presets of a media device in an electronic device.

FIG. 4 schematically shows an embodiment of a method for calibrating presets of a media device in an electronic device. At 401, the method starts. At 402, a number N of channel presets of the media device is determined. At 403, a preset counter i is initialized to 1. At 404, channel preset mapping information is determined for channel preset i according to the principles described with regard to FIGS. 1, 2 and 3. At 405, channel preset mapping information is stored for channel preset i. At 406, the preset counter i is incremented. At 407, it is determined whether the preset counter i is larger than the number N of channel presets. If yes, the method stops at 408. If no, the method jumps back to 404 to repeat 404, 405, 406, and 407.

Figure 5:
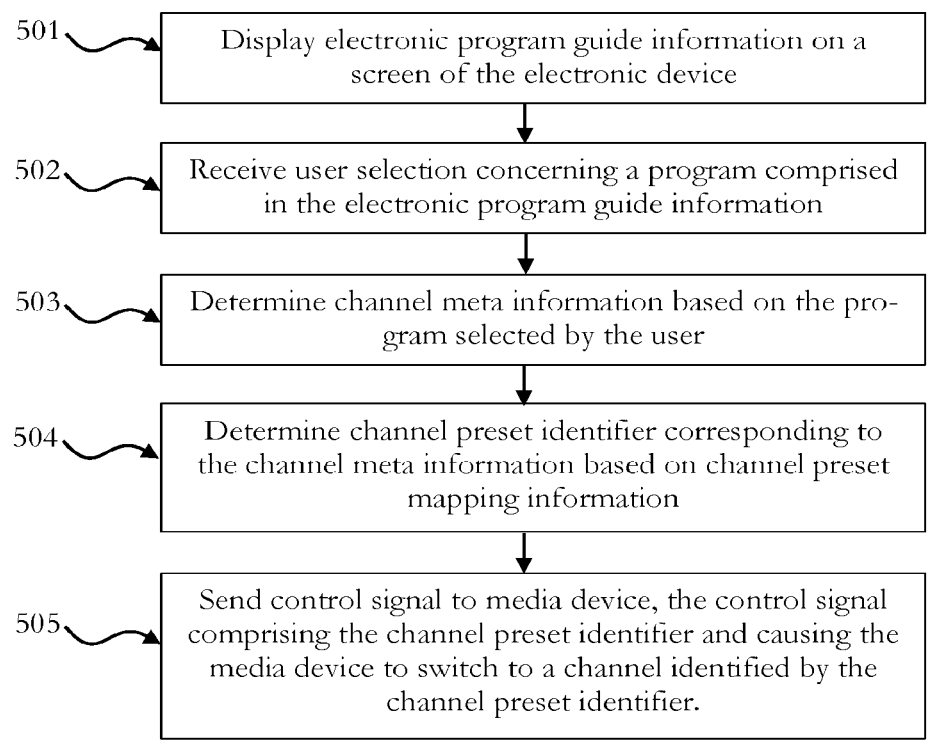
FIG. 5 schematically shows an embodiment of a method for controlling a media device directly from within an electronic program guide.

FIG. 5 schematically shows an embodiment of a method for controlling a media device directly from within an electronic program guide. At 501, an electronic device displays electronic program guide information on its screen. At 502, the electronic device receives a user selection concerning a program comprised in the electronic program guide information. At 503, the electronic device determines channel meta information based on the program selected by the user. At 504, the electronic device determines a channel preset identifier corresponding to the channel meta information based on channel preset mapping information. At 505, the electronic device sends a control signal to a media device, the control signal comprising the channel preset identifier and causing the media device to switch to a channel identified by the channel preset identifier.

FIG. 6 schematically shows a data structure, here a table, which stores channel preset mapping information collected by a calibration process as described above. The first column of the table comprises channel preset identifiers, the second column of the table comprises channel abbreviations, and the third column of the table comprises channel names. The table identifies that channel preset "1" identifies a physical channel on which the channel named "The News Channel" broadcasts its broadcast programs. Further, the table identifies that channel preset "2" identifies a physical channel on which the channel named "The Sports Channel" broadcasts its sport program. Further, the table identifies that that channel preset "3" identifies a physical channel on which the channel named "Education Now" broadcasts its education program. Still further, the table identifies that channel preset "4" identifies a physical channel on which the channel named "Movie 24" broadcasts movies. Still further, the table identifies that channel preset "5" identifies a physical channel on which the channel named "Music One" broadcasts its pop music program. Finally, the table identifies that channel preset "6" identifies a physical channel on which the channel named "Classic One" broadcasts its classic music program.

FIG. 7 schematically shows an electronic program guide as it may be displayed on an electronic device. The electronic program guide displays for Wednesday, 30 July broadcast programs that are broadcast between 7:30 PM and 10:00 PM. As can be read from the electronic program guide, channel "TNC" broadcasts a news report every 30 minutes. As can be further seen from the electronic program guide, channel "TSC" broadcasts the "Formula 1" between 7:30 PM and 8:00 PM and "Decathlon" between 8:00 PM and 10:00 PM. As can be further seen from the electronic program guide, channel "M1" broadcasts the "Top 25" between 7:30 PM and 8:00 PM, "Live from Alabama" between 8:00 PM and 9:00 PM, and "Rock under the Bridge" between 9:00 PM and 10:00 PM. As can be further seen from the electronic program guide, channel "M24" broadcasts the movie "Death in the Hotel" between 7:30 PM and 8:00 PM, and the movie "Behind the Murder" between 8:00 PM and 10:00 PM. As can be further seen from the electronic program guide, channel "EDU" broadcasts "Spanish 10" between 7:30 PM and 8:00 PM, a "Newscast" between 8:00 PM and 8:30 PM, and "General Theory of Relativity for Beginners" between 8:30 PM and 10:00 PM. As can be further seen from the electronic program guide, channel "C1" broadcasts a "Recorder Festival" between 7:30 PM and 8:00 PM, and Monteverdi's opera "L'Orfeo" between 8:00 PM and 10:00 PM. The user of the electronic device may select one of these broadcast programs with a touch gesture. Upon user selection, the electronic device may access a data structure as that displayed in the embodiment of FIG. 6 to identify the channel preset which corresponds to the broadcast program (respectively broadcast channel) selected by the user. The electronic device may then emit an infrared signal to cause a media device to switch to the physical channel on which the selected broadcast program is broadcast.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A method comprising sending a control signal from an electronic device to a media device, the control signal comprising a channel preset identifier and causing the media device to switch to a channel identified by the channel preset identifier; receiving, at the electronic device, an audio signal emitted by the media device; generating, by the electronic device, an audio fingerprint from the received audio signal; obtaining, by the electronic device, channel meta information based on the audio fingerprint; and determining channel preset mapping information, the channel preset mapping information associating the channel preset identifier with the channel meta information.

(2) A method comprising determining, for each channel preset from a predefined group of channel presets, channel preset mapping information according to the method of (1).

(3) The method of (1) or (2) in which the determining channel preset mapping information is executed in a preset calibration stage one by one for all channel presets in the predefined group of channel presets.

(4) A method comprising displaying electronic program guide information on a screen of the electronic device; receiving a user selection concerning a program comprised in the electronic program guide information; determining channel meta information based on the program selected by the user; determining a channel preset identifier corresponding to the channel meta information based on channel preset mapping information, the channel preset mapping information having been obtained according to the method of anyone of (1) to (3); and sending a control signal to a media device, the control signal comprising the channel preset identifier and causing the media device to switch to a channel identified by the channel preset identifier.

(5) The method of anyone of (1) to (4) in which the obtaining channel meta information comprises transmitting the audio fingerprint to an audio fingerprint identification service; and receiving the channel meta information from the audio fingerprint identification service.

(6) The method of anyone of (1) to (5) in which the obtaining channel meta information comprises comparing, in the electronic device, the audio fingerprint to a set of reference fingerprints stored locally in the electronic device to determine a matching audio fingerprint; and obtaining channel meta information based on the matching audio fingerprint.

(7) The method of anyone of (6), wherein the set of reference audio fingerprints is obtained by sending a signal to a reference fingerprint provider, the signal comprising timing information; and receiving from the reference fingerprint provider a set of reference fingerprints, the composition of the set of reference fingerprints depending on the timing information sent to the reference fingerprint provider.

(8) The method of anyone of (1) to (7) in which the channel meta information comprises a channel name, a channel identifier, or a channel abbreviation.

(9) The method of anyone of (1) to (8) in which the control signal is an infrared signal.

(10) A computer program comprising instructions for being executed on a processor of an electronic device, the instructions, when executed, causing the processor to perform: sending a control signal from the electronic device to a media device, the control signal comprising a channel preset identifier and causing the media device to switch to a channel identified by the channel preset identifier; receiving, at the electronic device, an audio signal emitted by the media device; generating, by the electronic device, an audio fingerprint from the received audio signal; obtaining, by the electronic device, channel meta information based on the audio fingerprint; and determining channel preset mapping information, the channel preset mapping information associating the channel preset identifier with the channel meta information.

(11) The computer program of (9), wherein the computer program is part of an interactive electronic program guide application.

(12) An electronic device, the electronic device being configured to send a control signal to a media device, the control signal comprising a channel preset identifier and causing the media device to switch to a channel identified by the channel preset identifier; receive an audio signal emitted by the media device; generate an audio fingerprint from the received audio signal; obtain channel meta information based on the audio fingerprint; determine channel preset mapping information, the channel preset mapping information associating the channel preset information with the channel meta information.

(13) The electronic device of (12), wherein the electronic device is a tablet computer, a smartphone, or a notebook computer.

(14) A system comprising an electronic device of (12) or (13) and a reference fingerprint provider, the electronic device being configured to request a set of reference fingerprints from the reference fingerprints provider.

(15) A system comprising an electronic device of (12) or (13) and an audio fingerprint identification server, the electronic device transmitting an audio fingerprint to the audio fingerprint identification service, and obtaining channel meta information related to the audio fingerprint from the audio fingerprint identification service.

(16) A computer program comprising program code causing a computer to perform the method according to anyone of (1) to (9), when being carried out on a computer.

(17) A non-transitory computer-readable recording medium that stores therein a computer program product, which, when executed by a processor, causes the method according to anyone of (1) to (9) to be performed.

The invention claimed is:

1. A method comprising:
  for each of a plurality of channel presets stored in a media device,
    automatically without an interaction by a user, sending, by circuitry of an electronic device different from the media device, a control signal to the media device, the control signal including a respective channel preset identifier corresponding to a respective channel preset and causing the media device to switch to a channel associated by a user with the respective channel preset in the media device;
    receiving, by the circuitry, an audio signal from the switched channel and emitted via an output port of the media device;
    generating, by the circuitry, an audio fingerprint from the received audio signal;
    obtaining, by the circuitry, channel meta information based on the generated audio fingerprint, the channel meta information including at least a channel and a channel identifier of the corresponding audio fingerprint; and
    determining, by the circuitry, channel preset mapping information, the channel preset mapping information associating the respective channel preset with the obtained channel meta information based on the generated audio fingerprint.

2. The method according to claim 1, wherein the determining the channel preset mapping information is executed in a preset calibration stage one by one for all channel presets in the plurality of channel presets.

3. The method according to claim 1, further comprising:
  displaying, by the circuitry, electronic program guide information on a screen of the electronic device;
  receiving, by the circuitry, a user selection concerning a program comprised in the electronic program guide information;
  determining, by the circuitry, second channel meta information based on the program selected by the user;
  determining, by the circuitry, a second channel preset identifier corresponding to the second channel meta information based on the determined channel preset mapping information; and
  sending, by the circuitry, a second control signal to the media device, the second control signal including the determined second channel preset identifier and causing the media device to switch to a channel identified by the determined second channel preset identifier.

4. The method according to claim 1, wherein the obtaining channel meta information comprises:
  transmitting, by the circuitry, the audio fingerprint to an audio fingerprint identification service; and
  receiving, by the circuitry, the channel meta information from the audio fingerprint identification service.

5. The method according to claim 1, wherein the obtaining the channel meta information comprises:

comparing, by the circuitry, the audio fingerprint to a set of reference fingerprints stored locally in the electronic device to determine a matching audio fingerprint; and obtaining, by the circuitry, the channel meta information based on the matching audio fingerprint.

6. The method according to claim 5, wherein the set of reference audio fingerprints is obtained by:

sending, by the circuitry, a signal to a reference fingerprint provider, the signal including timing information; and receiving, by the circuitry from the reference fingerprint provider, a set of reference fingerprints and channel meta information related to the respective reference fingerprints of the set of reference fingerprints, the composition of the set of reference fingerprints depending on the timing information sent to the reference fingerprint provider.

7. The method according to claim 1, wherein the control signal is an infrared signal.

8. A non-transitory computer readable medium comprising computer program instructions that, when executed by circuitry of an electronic device cause the electronic device to:

for each channel of a plurality of channel presets, automatically without an interaction by a user, send a control signal to a media device from the electronic device different from the media device, the control signal including a respective channel preset identifier corresponding to a respective channel preset and causing the media device to switch to a channel associated by a user with the respective channel preset;

receive, at the electronic device, an audio signal from the switched channel and emitted via an output port of the media device;

generate an audio fingerprint from the received audio signal;

obtain channel meta information based on the generated audio fingerprint, the channel meta information including at least a channel name and a channel identifier of the corresponding audio fingerprint; and determine channel preset mapping information, the channel preset mapping information associating the respective channel preset with the obtained channel meta information based on the generated audio fingerprint.

9. The non-transitory computer readable medium according to claim 7, wherein the computer program instructions is part of an interactive electronic program guide application.

10. An electronic device comprising:

circuitry configured to:

for each channel of a plurality of channel presets stored in a media device, automatically without an interaction by a user, send a control signal to the media device from the electronic device different from the media device, the control signal including a respective channel preset identifier corresponding to a respective channel preset and causing the media device to switch to a channel associated by a user with the respective channel preset in the media device;

receive an audio signal from the switched channel and emitted via an output port of the media device;

generate an audio fingerprint from the received audio signal;

obtain channel meta information based on the generated audio fingerprint, the channel meta information including at least a channel name and a channel identifier of the corresponding audio fingerprint;

determine channel preset mapping information, the channel preset mapping information associating the respective channel preset with the obtained channel meta information based on the generated audio fingerprint.

11. The electronic device according to claim 10, wherein the electronic device is a tablet computer, a smartphone, or a notebook computer, and the media device is a television set, a radio device, a home cinema system or a music player device.

12. A system comprising an electronic device as claimed in claim 10 and a reference fingerprint provider, the electronic device being configured to request a set of reference fingerprint from the reference fingerprint provider.

13. A system comprising an electronic device as claimed in claim 10 and an audio fingerprint identification server, the electronic device transmitting an audio fingerprint to the audio fingerprint identification server, and receiving the channel meta information related to the audio fingerprint from the audio fingerprint identification server.

14. The method according to claim 1, wherein the output port of the media device includes a speaker.

15. The method according to claim 1, wherein the audio fingerprint is a digital bit sequence that identifies an audio sample or locates similar media items in a database.

* * * * *